(12) United States Patent
Ito et al.

(10) Patent No.: US 10,455,095 B2
(45) Date of Patent: Oct. 22, 2019

(54) IMAGE COMMUNICATION APPARATUS HAVING A MAINTENANCE OPERATION MODE, METHOD OF CONTROLLING THE SAME, AND STORAGE MEDIUM

(71) Applicant: CANON KABUSHIKI KAISHA, Tokyo (JP)

(72) Inventors: Chie Ito, Abiko (JP); Yuichi Kondo, Abiko (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/628,830

(22) Filed: Jun. 21, 2017

(65) Prior Publication Data

US 2018/0020103 A1 Jan. 18, 2018

(30) Foreign Application Priority Data

Jul. 14, 2016 (JP) .................................. 2016-139699

(51) Int. Cl.
*H04N 1/00* (2006.01)
*G06F 3/12* (2006.01)
*G06F 15/00* (2006.01)

(52) U.S. Cl.
CPC ....... *H04N 1/00084* (2013.01); *H04N 1/0005* (2013.01); *H04N 1/00053* (2013.01); *H04N 1/00925* (2013.01)

(58) Field of Classification Search
CPC ............. H04N 1/00084; H04N 1/0005; H04N 1/00053; H04N 1/00925
USPC ........................ 358/400, 1.1, 1.13, 1.14, 1.15
See application file for complete search history.

(56) References Cited

U.S. PATENT DOCUMENTS

| 6,570,667 | B1* | 5/2003 | Hattori |
|---|---|---|---|
| 2011/0037999 | A1* | 2/2011 | Sano |
| 2011/0102856 | A1* | 5/2011 | Kadota ............. H04N 1/32005 358/442 |
| 2014/0368854 | A1 | 12/2014 | Iwadate |
| 2018/0183950 | A1* | 6/2018 | Nagasawa .......... H04N 1/00244 |

FOREIGN PATENT DOCUMENTS

JP 2015-002372 A 1/2015

* cited by examiner

*Primary Examiner* — Douglas Q Tran
(74) *Attorney, Agent, or Firm* — Venable LLP (57) ABSTRACT

Facsimile reception is prohibited when an operation mode in which a service person performs printing for the purpose of maintenance is set.

11 Claims, 9 Drawing Sheets

```
COPY START : START KEY

NUMBER OF COPIES : 1
SHEET : CASSETTE 1
    A4 : PLAIN PAPER
PAGE AGGREGATION : OFF
DOUBLE-SIDED : OFF
SCALING RATIO : 100%
```

FIG. 3B

```
COPY START : START KEY
                    CONFIRM PRINT MODE    301

NUMBER OF COPIES : 1
SHEET : CASSETTE 1
    A4 : PLAIN PAPER
PAGE AGGREGATION : OFF
DOUBLE-SIDED : OFF
SCALING RATIO : 100%
```

FIG. 3C

```
MAINTENANCE MODE MENU
ERROR LOG
VERSION INFORMATION
COUNTER INFORMATION
IMAGE ADJUSTMENT
SET CONFIRM PRINT MODE
TEST PRINT
```
302

FIG. 3D

```
MAINTENANCE MODE MENU
ERROR LOG
VERSION INFORMATION
COUNTER INFORMATION
IMAGE ADJUSTMENT
RELEASE CONFIRM PRINT MODE
TEST PRINT
```
303

IMAGE COMMUNICATION APPARATUS HAVING A MAINTENANCE OPERATION MODE, METHOD OF CONTROLLING THE SAME, AND STORAGE MEDIUM

BACKGROUND OF THE INVENTION

Field of the Invention

The present invention relates to an image communication apparatus, a method of controlling the same, and a storage medium.

Description of the Related Art

Conventionally, in an image forming apparatus provided with a copy function and a print function, to suppress usage in which a user pretends to be a service person to perform printing without being charged, there is an apparatus provided with a mode in which a service person uses the apparatus. Japanese Patent Laid-Open No. 2015-2372 discloses that an image forming apparatus provided with such a mode prints by superimposing an image of a specific pattern onto inputted print data without updating a charging counter during the mode.

However, in the image forming apparatus of Japanese Patent Laid-Open No. 2015-2372, during the mode in which the service person uses the apparatus, discrimination is not made between whether inputted print data is something that a service person inputted or something that a user inputted. Therefore, if acceptance of jobs from outside such as a network or a telephone line is not restricted during the mode, printing will be performed after superimposing the aforementioned specific pattern in printing of a document received by FAX (hereinafter referred to as a FAX reception print). Therefore, in this image forming apparatus, even in the case of a mode in which a service person uses the apparatus, printing is performed without superimposing the specific pattern and the charging counter is updated in a FAX reception print. Therefore, when a service person performs a FAX reception print with the objective of maintenance, processing is complicated because processing such as separately recording an amount for the updated charging counter and not invoicing the user is required.

SUMMARY OF THE INVENTION

An aspect of the present invention is to eliminate the above-mentioned problems with the conventional techniques.

A feature of the present invention is to provide a technique for enabling maintenance to be performed without being conscious of facsimile reception, in an operation mode that a service person uses.

According to a first aspect of the present invention, there is provided an image communication apparatus, comprising: at least one processor; and at least one memory having instructions stored thereon which, when executed by the at least one processor, cause the image communication apparatus to function as: a setting unit configured to set an operation mode in which a service person performs printing for the purpose of maintenance; and a control unit configured to prohibit facsimile reception when the operation mode is set by the setting unit.

According to a second aspect of the present invention, there is provided an image communication apparatus, comprising: at least one processor; and at least one memory having instructions stored thereon which, when executed by the at least one processor, cause the image communication apparatus to function as: a setting unit configured to set an operation mode in which a service person performs printing for the purpose of maintenance; and a control unit configured to prohibit POP reception of an IFAX when the operation mode is set by the setting unit.

According to a third aspect of the present invention, there is provided an image communication apparatus, comprising: at least one processor; and at least one memory having instructions stored thereon which, when executed by the at least one processor, cause the image communication apparatus to function as: a setting unit configured to set an operation mode in which a service person performs printing for the purpose of maintenance; a memory reception setting unit configured to set a memory reception upon reception of a facsimile when the operation mode is set by the setting unit; and a control unit configured to control to, when the memory reception is set, store the received facsimile image to a memory, and print the facsimile image stored in the memory when the operation mode is released.

According to a fourth aspect of the present invention, there is provided an image communication apparatus, comprising: at least one processor; and at least one memory having instructions stored thereon which, when executed by the at least one processor, cause the image communication apparatus to function as: a setting unit configured to set an operation mode in which a service person performs printing for the purpose of maintenance; a registration unit configured to register information of a transmission source of an image; a determination unit configured to determine whether or not a transmission source of a received image is registered by the registration unit when the operation mode is set by the setting unit; and a control unit configured to control to, when the determination unit determines that the transmission source of the image is registered by the registration unit, print the received image after superimposing a specific pattern thereon.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3A to FIG. 3D depict views illustrating examples of operation screens displayed on the operation panel of the image forming apparatus according to the first embodiment.

FIG. 8A to FIG. 8C depict views for illustrating examples of screens displayed on a touch panel of the operation panel of the image forming apparatus according to a second embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that, in the embodiments, explanation is given by taking an MFP (Multi-Function Peripheral) as an example of an image communication apparatus of the present invention, but the image communication apparatus is not limited to this, and for example may be a facsimile apparatus, a printer, a copying machine, or the like.

[First Embodiment]

Figure 1:
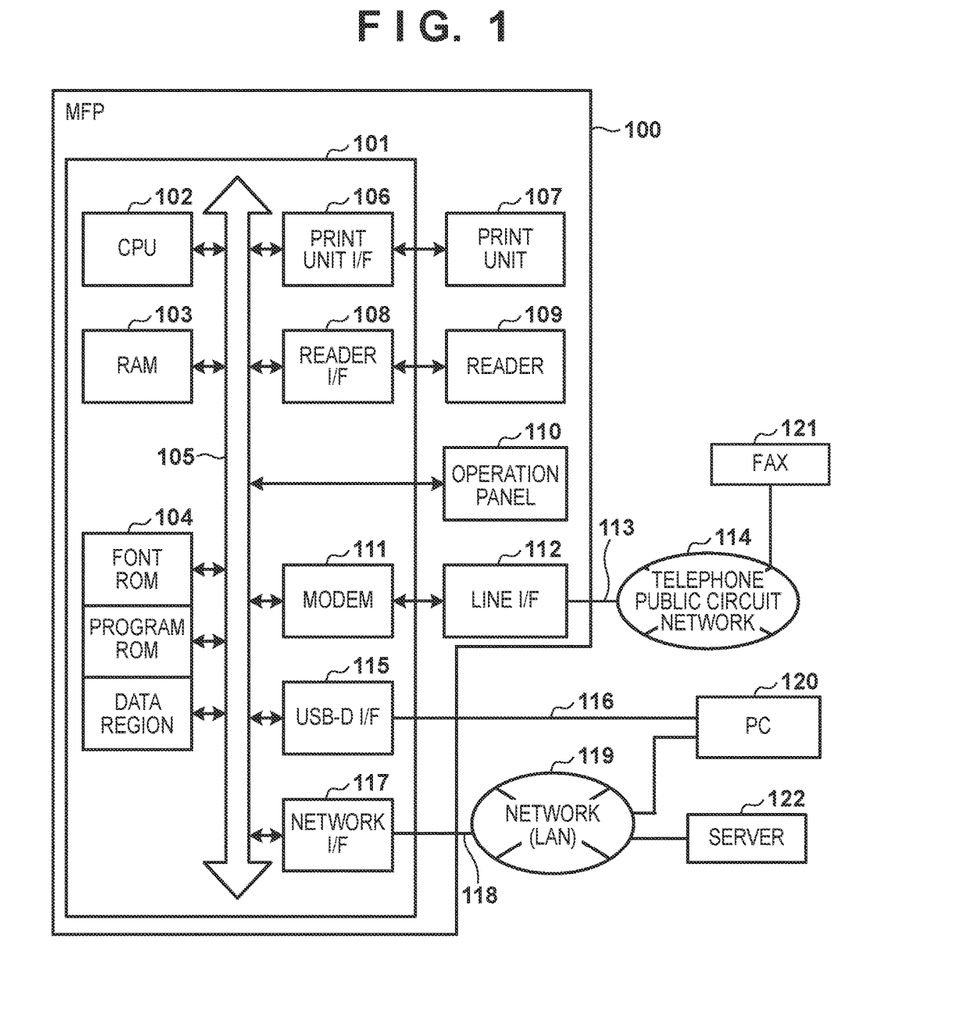
FIG. 1 is a block diagram for explaining a configuration of an image forming apparatus (MFP) according to a first embodiment of the present invention, and a configuration of a system that includes the MFP.

FIG. 1 is a block diagram for explaining the configuration of an image forming apparatus (an MFP) 100 according to a first embodiment of the present invention, and a configuration of a system that includes the MFP 100. Each block here indicates a module, and arrows between blocks indicate flows of data or control signals.

The image forming apparatus 100 has a print unit 107, a reader 109, an operation panel 110, a line I/F (interface) 112, and a control unit 101 that is responsible for control of these. The control unit 101 has a CPU 102, a RAM 103, a ROM 104, a print unit I/F 106, a reader I/F 108, a modem 111, a USB-I/F 115, and a network I/F 117, and these blocks are connected via a system bus 105.

The CPU 102 comprehensively controls each of the above blocks in accordance with a control program. The control program is stored in a program region of the ROM 104. By the CPU 102 executing this program or deploying compressed data that was stored in the program region of the ROM 104 to the RAM 103 and executing it, control that is described later is executed. In addition, configuration may be taken such that the previously described control program is stored in advance in a hard disk drive (HDD) (not shown) in a compressed state or a non-compressed state, and at a time of execution, the CPU 102 deploys it to the RAM 103 and executes it.

The network I/F 117 performs communication processing with a host computer 120 (PC in the drawing) or a server 122, via a network (LAN) 119. The PC 120 may be connected via the USB-I/F 115 and a USB cable 116. The network I/F 117 and the network 119 are connected by a communication cable such as a LAN cable 118. The modem 111 is connected to a telephone public circuit network 114 via a line interface 112, and performs communication with a FAX apparatus 121 or another data communication apparatus, telephone apparatus, or the like (not shown). The line interface 112 and the telephone public circuit network 114 are typically connected with a telephone line 113 or the like.

The print unit I/F 106 is responsible for an interface for outputting an image signal to the print unit 107 (a printer engine). The reader I/F 108 is responsible for an interface for inputting an image signal from the reader 109 (a scanner engine). The CPU 102 processes an image signal inputted by the reader I/F 108, and outputs it as a print image signal to the print unit 107, via the print unit I/F 106.

The CPU 102 uses font information stored in a data region of the ROM 104 to display text or signs on a display unit of the operation panel 110, and accepts instruction information from the operation panel 110 which has accepted an instruction by a user. In addition, the data region of the ROM 104 stores apparatus information of the image forming apparatus 100, telephone directory information of a user, or the like, and this information is read out as necessary, and is updated as necessary. Accordingly, it is desirable for this data region to be a non-volatile storage unit and not a ROM.

Note that the reader 109 and the print unit 107 are configured inside the image forming apparatus 100, but each or both may be configured externally.

The image forming apparatus 100 according to the first embodiment has the next two operation modes.

The first operation mode is an operation mode in which a typical user uses a copy function, a print function, a scanner function, and a FAX function. This operation mode is referred to below as a "normal mode". The second operation mode is a "maintenance mode" in which a service person uses the image forming apparatus 100. The maintenance mode is a mode in which a service person performs maintenance work. When for example deterioration or color misregistration has occurred in an image printed by the image forming apparatus 100, the service person causes the image forming apparatus 100 to transition to the maintenance mode to confirm or change settings of parameters, and confirm operation of a copy or print function, or a FAX transmission and reception function. Note that, in a copy job or a print job executed at a time of the maintenance mode, printing is performed by superimposing a specific pattern, and for this printing, a charging counter is not updated and it is processed as non-charged.

Figure 2:
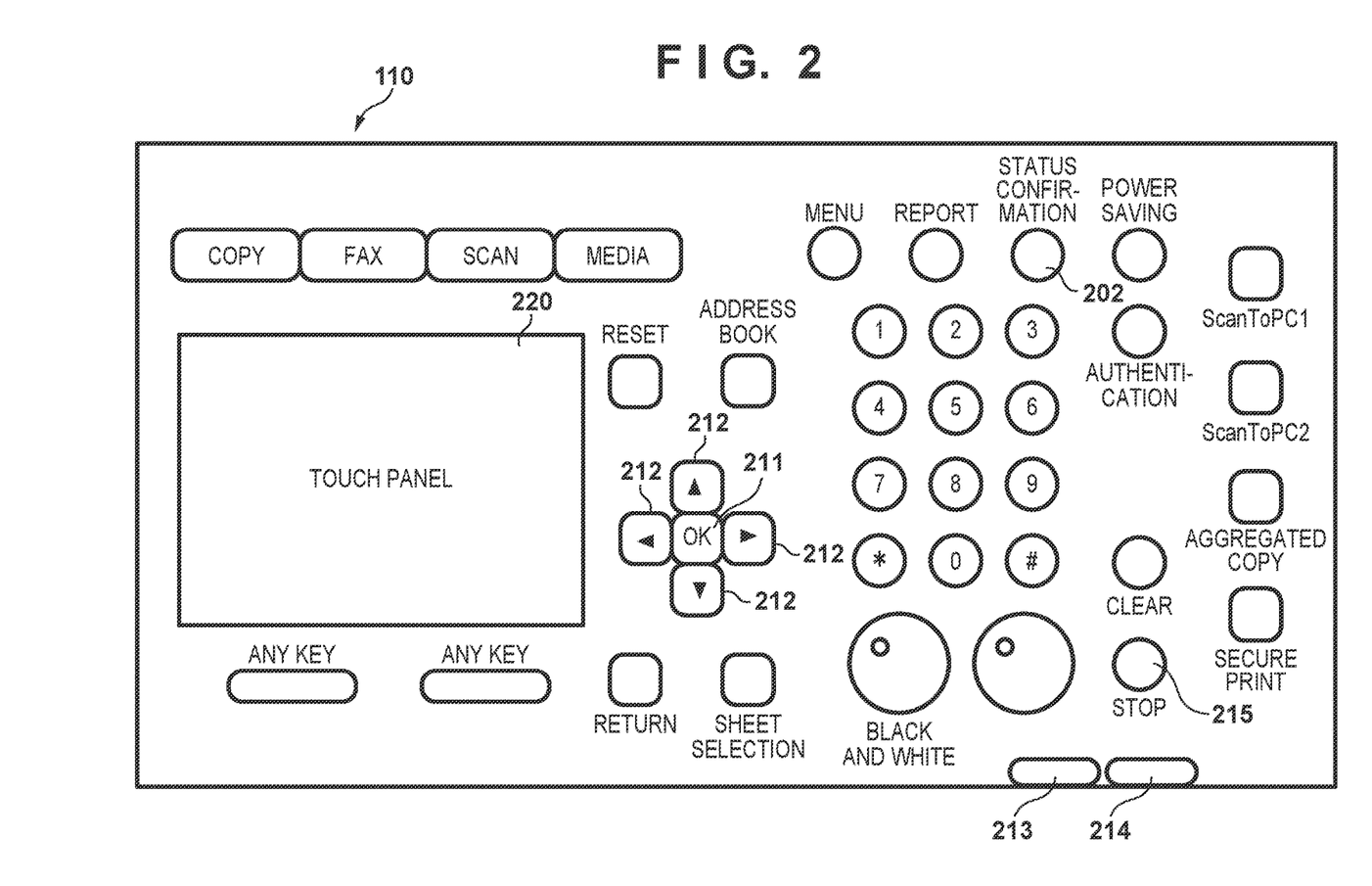
FIG. 2 depicts a perspective view of an operation panel of the image forming apparatus according to the first embodiment.

FIG. 2 depicts a perspective view of the operation panel 110 of the image forming apparatus 100 according to the first embodiment.

The operation panel 110 has a touch panel 220 that displays an operation screen that is described later, and various hard keys. The touch panel 220 and the various hard keys accept an instruction from a user. The operation panel 110 is provided with a cursor keypad 212 for instructing transition of up, down, left and right directions for selecting an option on a screen displayed on the touch panel 220, and an OK key 211 for deciding the option selected by the cursor keypad 212. A user can use the cursor keypad 212 and the OK key 211 to select one item from the options on the screen to designate it. In addition, a user can also designate an option by directly touching an object such as a stylus or a finger to an option displayed on the touch panel 220.

A status confirmation key 202 is a key for instructing a screen (a status confirmation screen) for confirming a state of the image forming apparatus 100 to be displayed. A user can press the status confirmation key 202 to cause the status confirmation screen to be displayed on the touch panel 220, and confirm a state of a print job that is being executed via this screen. A lamp (LED) 213 and a lamp (LED) 214 are for notifying a state of the image forming apparatus 100 to a user, and the lamp 213 lights during execution or during reception of an electronic mail or a print job, and the lamp 214 lights when some kind of error has occurred in the image forming apparatus 100. A stop key 215 can instruct an interruption or cancellation of a job, and is used in a case of interrupting processing during reception or during printing of data.

FIG. 3A to FIG. 3D depict views illustrating examples of operation screens displayed on the operation panel 110 of the image forming apparatus 100 according to the first embodiment.

Figure 3A:
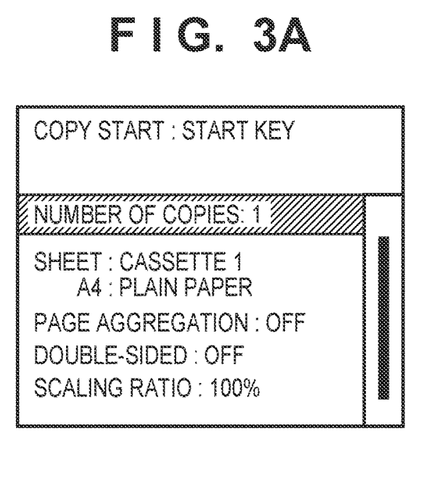

FIG. 3A illustrates an example of a main screen of a copy function in the normal mode. The screen is configured by 7 lines: a message is displayed on the first and second lines, and some setting items of a copy function are displayed on the third to seventh lines. In the main screen, copying is started in accordance with a start key, a number of copies is 1, a sheet to use in the copying is A4 from cassette 1, plain paper is selected, page aggregation and a double-sided print are both off, and a scaling ratio is 100%, in other words non-scaled is set.

Figure 3B:
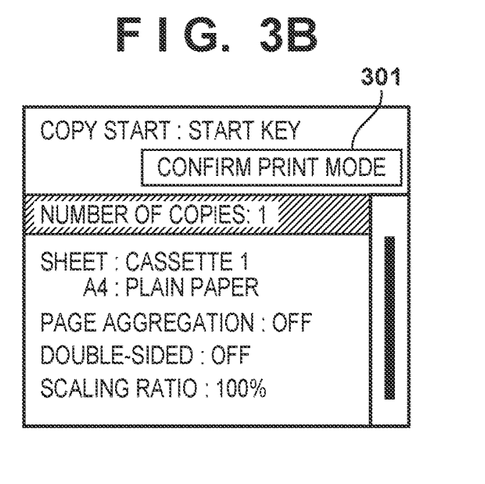

FIG. 3B illustrates an example of a main screen in the confirm print mode. In this screen, a message 301 indicating being in the confirm print mode is displayed on the second line. A menu displayed in this main screen is the same as in FIG. 3A, but differs in that the message 301 for alerting that the image forming apparatus 100 is in the confirm print mode is displayed in an upper part of the screen. By this display, a user or a service person can confirm that the image forming apparatus 100 is currently in the confirm print mode. Note that the confirm print mode is a mode for a service person to use a copy or print function. The confirm print mode is used in a case where, for example after a service person has performed color adjustment or the like of an image, normal copying or printing is performed, and a print result is confirmed.

Figure 3C:
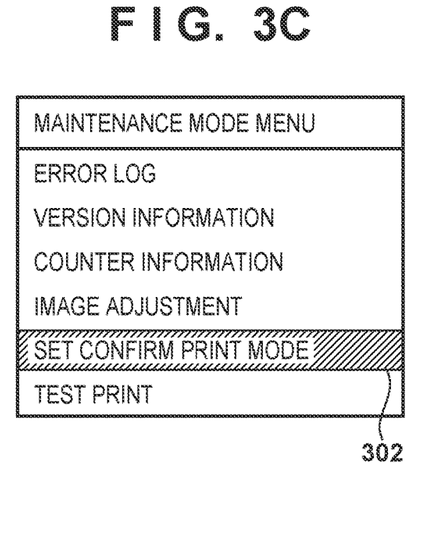

FIG. 3C illustrates an example of a menu screen of a maintenance mode that is displayed when the image forming apparatus 100 according to the first embodiment has entered the maintenance mode. The image forming apparatus 100 transitions to the maintenance mode in accordance with a service person performing a special key operation via the operation panel 110. For example, a transition is made to the maintenance mode by a service person inputting an ID and password via the operation panel 110, and performing a special operation such as a long press of a specific key or a simultaneous press of a plurality of specific keys that are provided on the operation panel 110. In addition, when leaving the maintenance mode, the normal mode or the confirm print mode is transitioned to by performing a special key operation. It is presumed that such an operation is a special operation that can only be known by a service person, and is not disclosed to a common user. Note that a confirm print mode setting button 302 is a button for instructing a transition from the maintenance mode to the confirm print mode.

Figure 3D:
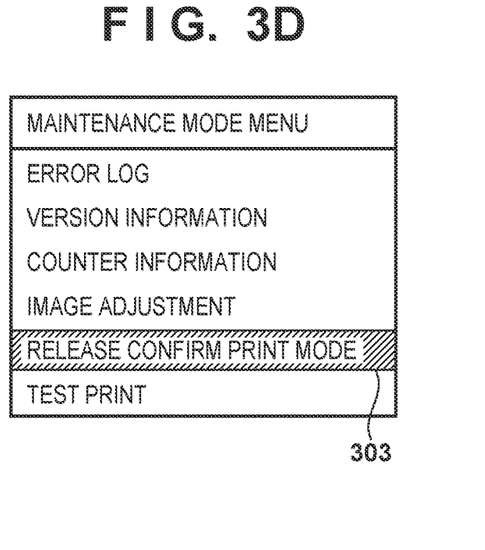

FIG. 3D illustrates an example of a menu screen of the maintenance mode that is displayed when the image forming apparatus 100 according to the first embodiment in the maintenance mode and is also in the confirm print mode.

A confirm print mode release button 303 is a button for instructing that the image forming apparatus 100 leave the confirm print mode.

Figure 4:
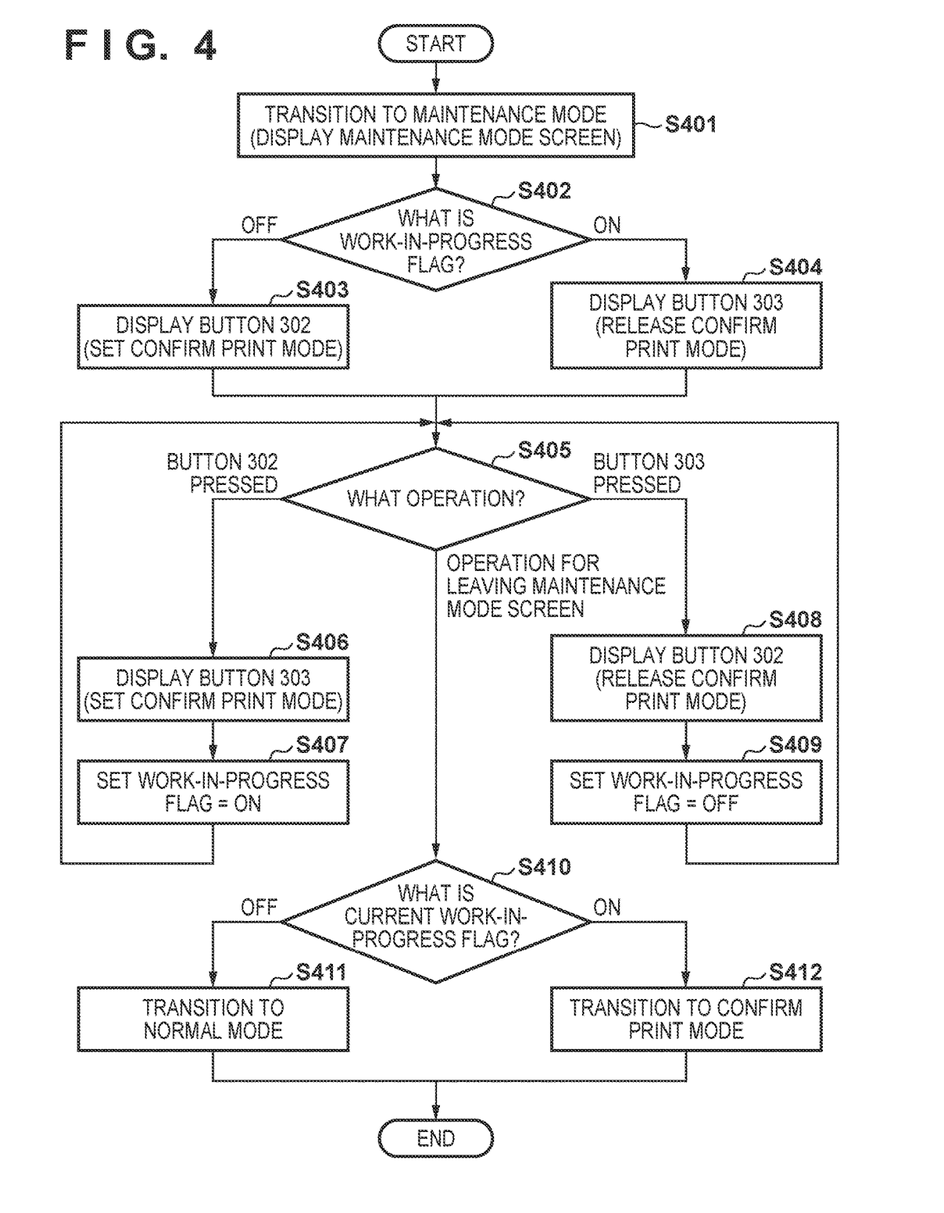
FIG. 4 is a flowchart for describing transition processing of operation modes in the image forming apparatus according to the first embodiment.

FIG. 4 is a flowchart for describing transition processing of operation modes in the image forming apparatus 100 according to the first embodiment. Note that the processing illustrated by the flowchart is achieved by the CPU 102 deploying the control program stored in the ROM 104 into the RAM 103, and executing it. The processing procedure shown in FIG. 4 is started by the image forming apparatus 100 entering the maintenance mode.

On the operation panel 110 of the image forming apparatus 100, when the special operation for entering the service person mode that can only be known by a service person is instructed by a service person, in step S401 the CPU 102 transitions the image forming apparatus 100 into the maintenance mode. Proceeding next to step S402, the CPU 102 determines whether a "work-in-progress flag" that is stored in the RAM 103 is ON or OFF. The "work-in-progress flag" is a control flag (OFF/ON) for determining whether or not the confirm print mode is set. Note that this control flag is initialized to OFF by the CPU 102 at a time of activation of the image forming apparatus 100. Accordingly, after activation, when the maintenance mode is first entered the "work-in-progress flag" is OFF, and thus the processing proceeds from step S402 to step S403. In step S403, the CPU 102 executes display processing for displaying a screen that displays the confirm print mode setting button 302 as illustrated in FIG. 3C, and then the processing proceeds to step S405. Meanwhile, if the "work-in-progress flag" is ON, the processing proceeds to step S404, and the CPU 102 executes display processing for displaying a screen that displays the confirm print mode release button 303 as illustrated in FIG. 3D, and then the processing proceeds to step S405.

In step S405, the CPU 102 receives an operation that is inputted via the operation panel 110, in a state in which the screen of FIG. 3C or FIG. 3D is displayed. Note that the operation content here is one of three types: a press of the confirm print mode setting button 302 for setting the confirm print mode, a press of the confirm print mode release button 303 for releasing the confirm print mode, and an operation to leave the maintenance mode screen. This flowchart is abbreviated in regards to other operations.

In step S405, when the CPU 102 determines that the confirm print mode setting button 302 has been pressed, the processing proceeds to step S406. In step S406, the CPU 102 sets the confirm print mode, and executes display processing to display the confirm print mode release button 303 (FIG. 3D), for releasing the confirm print mode, that is substituted for the confirm print mode setting button 302. The processing proceeds to step S407, and the CPU 102 sets the "work-in-progress flag" of the RAM 103 to ON, and the processing proceeds to step S405.

Meanwhile, when the CPU 102 determines in step S405 that the confirm print mode release button 303 has been pressed, the processing proceeds to step S408. In step S408, the CPU 102 executes display processing for displaying the confirm print mode setting button 302 (FIG. 3C) for setting the confirm print mode substituted for the confirm print mode release button 303, and the processing proceeds to step S409. In step S409 the CPU 102 sets the "work-in-progress flag" of the RAM 103 to OFF, and the processing returns to step S405.

In step S405, when the CPU 102 determines that an operation for leaving the maintenance mode has been performed, the processing proceeds to step S410. An operation for leaving the maintenance mode is performed in accordance with determining whether or not a service person has operated a key (not shown) via the operation panel 110. Alternatively, configuration may also be taken to leave the maintenance mode screen in accordance with a period in which the service person has performed no operation passing a predetermined time period. In step S410, the CPU 102 confirms the "work-in-progress flag" stored in the RAM 103, and if it is OFF, the processing proceeds to step S411, the normal mode is transitioned into, and this processing terminates. Meanwhile, if the "work-in-progress flag" is ON, the processing proceeds from step S410 to step S412, the confirm print mode is transitioned to, and this processing terminates.

Figure 5:
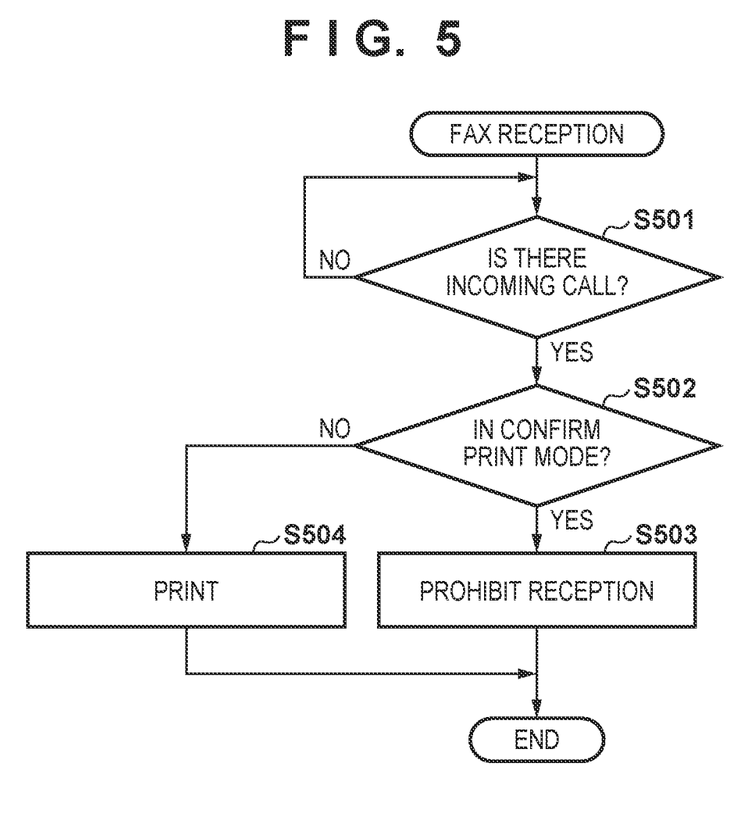
FIG. 5 is a flowchart for describing fax reception processing by the image forming apparatus according to the first embodiment.

FIG. 5 is a flowchart for describing fax reception processing by the image forming apparatus 100 according to the first embodiment. Note that the processing illustrated by the flowchart is achieved by the CPU 102 deploying the control program stored in the ROM 104 into the RAM 103, and executing it.

Firstly, in step S501 the CPU 102 determines whether or not there is an incoming call from the telephone public circuit network 114, and if there is an incoming call, the processing proceeds to step S502. In step S502, the CPU 102 determines whether or not the confirm print mode is set. This is determined in accordance with whether or not the "work-in-progress flag" previously described is ON. When the confirm print mode is determined to be ON, the processing proceeds to step S503, and the CPU 102 sets reception of a facsimile as prohibited, and this processing terminates. Meanwhile, when it is determined in step S502 that the confirm print mode is not set, the processing proceeds to step S504, and the CPU 102 prints a received image for the received facsimile, and this processing terminates.

Figure 6:
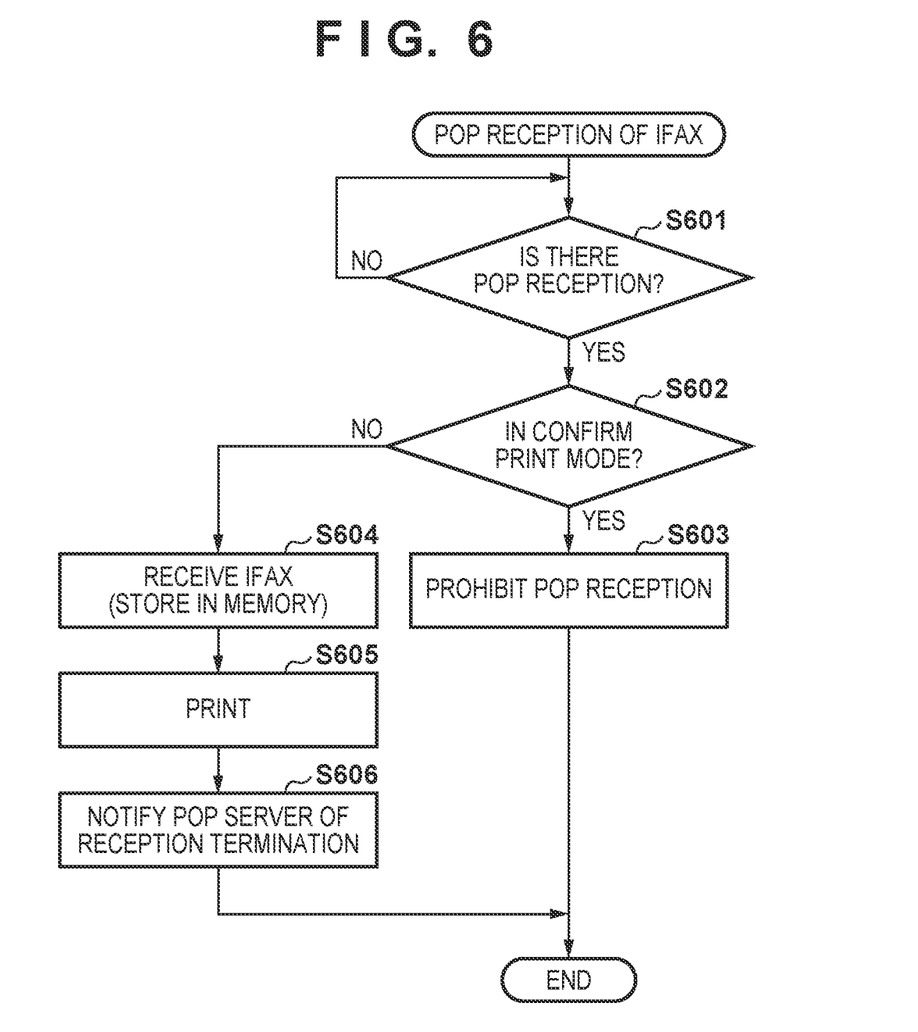
FIG. 6 is a flowchart for describing POP reception processing of an IFAX by the image forming apparatus according to the first embodiment.

FIG. 6 is a flowchart for describing POP reception processing for an IFAX by the image forming apparatus 100 according to the first embodiment. Note that the processing illustrated by the flowchart is achieved by the CPU 102 deploying the control program stored in the ROM 104 into the RAM 103, and executing it.

Firstly, in step S601 the CPU 102 determines whether or not an email is present on a POP server. When it is determined that an email is present on the POP server, the processing advances to step S602. In step S602, the CPU 102 determines whether or not the confirm print mode is set, similarly to step S502 of FIG. 5 described above. When the confirm print mode is set, the processing proceeds to step S603, otherwise the processing proceeds to step S604. In step S603, the CPU 102 sets the execution of POP reception to prohibited, and this processing terminates.

In step S604, the CPU 102 executes an IFAX reception, and stores received image data in the RAM 103. The processing advances to step S605, and the CPU 102 reads out the image data that was received and stored in step S604 from the RAM 103, and prints it. Next, the processing advances to step S606, and the CPU 102 notifies the POP server of reception termination, and this processing terminates.

Figure 7:
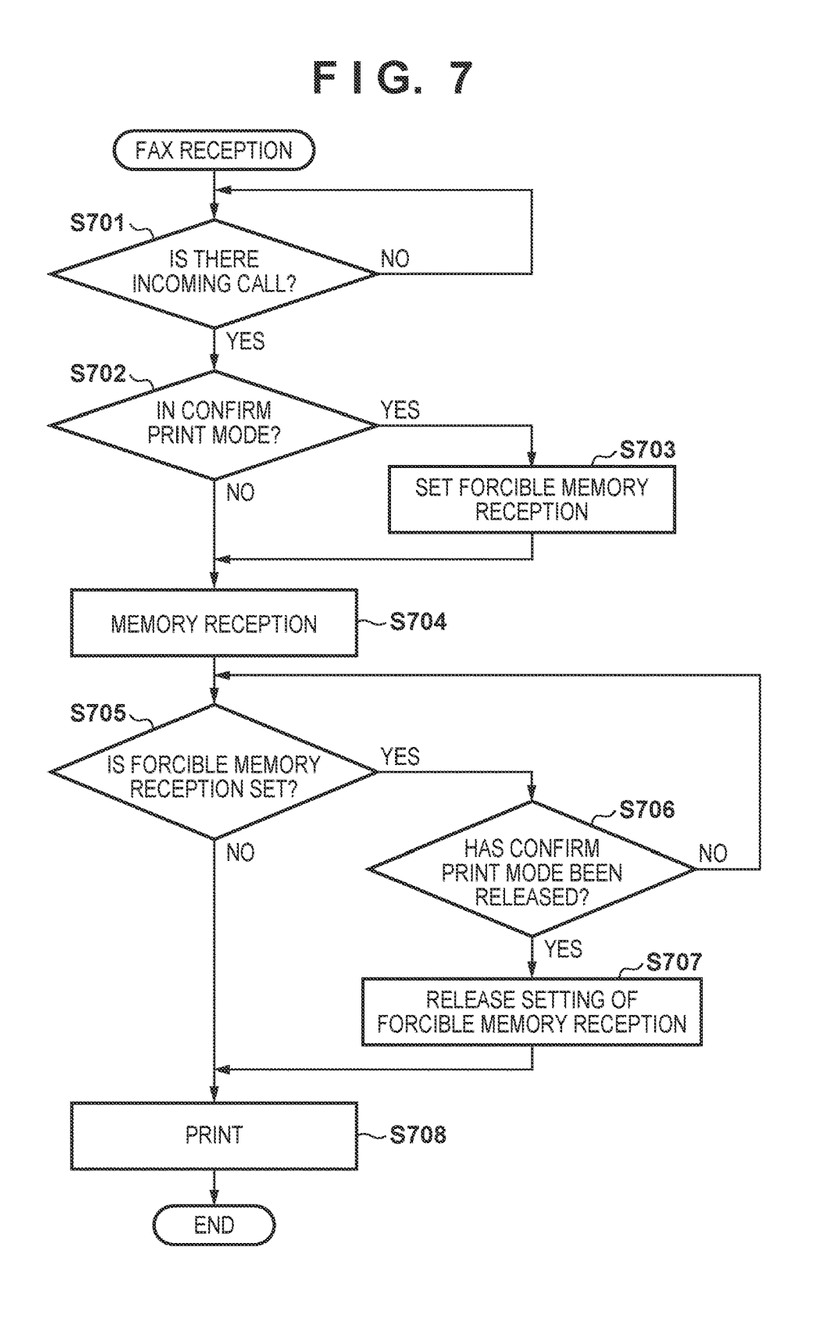
FIG. 7 is a flowchart for describing memory reception processing of a facsimile by the image forming apparatus according to the first embodiment.

FIG. 7 is a flowchart for describing memory reception processing of a facsimile by the image forming apparatus 100 according to the first embodiment. Note that the processing illustrated by the flowchart is achieved by the CPU 102 deploying the control program stored in the ROM 104 into the RAM 103, and executing it.

Firstly, in step S701 the CPU 102 determines whether or not there is an incoming call from the telephone public circuit network 114, and upon determining that there is an incoming call, the processing proceeds to step S702. In step S702, the CPU 102 determines whether or not the confirm print mode is set, similarly to step S502 of FIG. 5 described above. Upon determining that the confirm print mode is set, the processing proceeds to step S703, otherwise the processing proceeds to step S704. In step S703, the CPU 102 sets forcible memory reception, and the processing proceeds to step S704. The setting of forcible memory reception is stored in the RAM 103. In step S704, the CPU 102 receives the facsimile image of the incoming call, and stores the image data in the RAM 103.

The processing proceeds to step S705, and the CPU 102 determines whether or not forcible memory reception is set in the RAM 103, and if forcible memory reception is set, the processing proceeds to step S706, otherwise the processing proceeds to step S708. In step S706, the CPU 102 determines whether or not the setting of the confirm print mode has been released in accordance with the "work-in-progress flag" previously described. When it is determined in step S706 that the setting of the confirm print mode has been released, the processing proceeds to step S707, otherwise the processing returns to step S705. In step S707, the CPU 102 releases the setting of forcible memory reception, and the processing proceeds to step S708. At this point, the setting of forcible memory reception stored in the RAM 103 is also released. In step S708, the CPU 102 prints image data that was received and stored in the RAM 103 in step S704, and this processing terminates.

By the first embodiment as explained above, when there is a facsimile incoming call, and when an image communication apparatus is in an operation mode (a maintenance mode) in which a service person performs printing for the purpose of maintenance, it is possible to automatically set so that the facsimile is not received.

In addition, when there is POP reception of an IFAX, and when the image communication apparatus is in the operation mode (maintenance mode) in which a service person performs printing for the purpose of maintenance, it is possible to set so that POP reception of the IFAX is not performed.

In addition, when there is an incoming call for a facsimile, and when the image communication is in the operation mode (maintenance mode) in which a service person performs printing for the purpose of maintenance, forcible memory reception is set, and received image data is stored in a memory. It is possible to prohibit printing of a facsimile until the maintenance mode is released.

Accordingly, a service person can perform maintenance work in the maintenance mode without being aware that a facsimile may be received and printed.

[Second Embodiment]

Figure 8A:
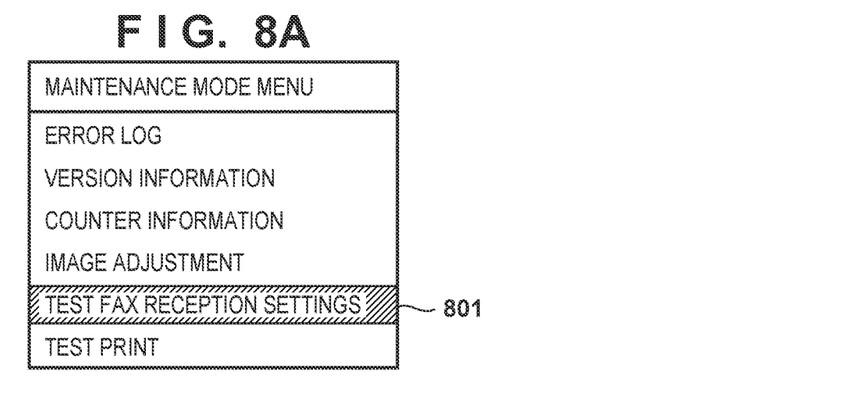
Figure 8B:
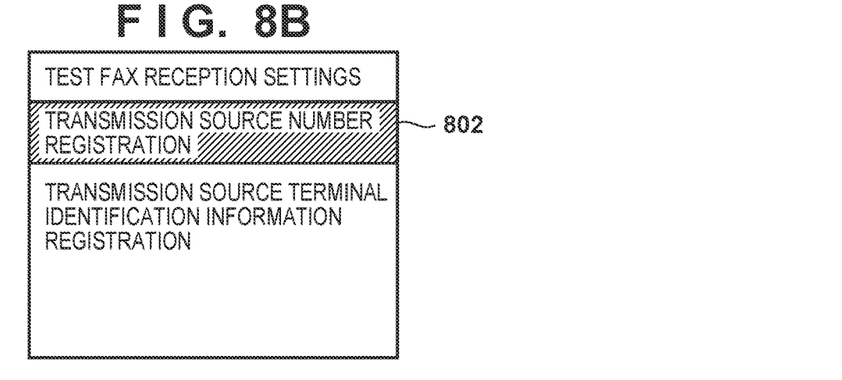
Figure 8C:
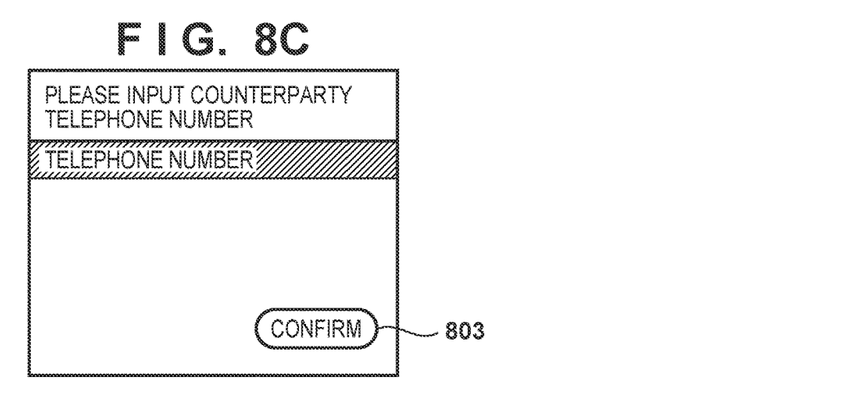

FIG. 8A through FIG. 8C depict views illustrating examples of screens displayed on the touch panel of the operation panel 110 of the image forming apparatus 100 according to a second embodiment.

FIG. 8A depicts a view illustrating an example of a menu screen of a maintenance mode that is displayed when the image forming apparatus 100 has transitioned to a maintenance mode.

A transition to the maintenance mode is performed by a service person performing a special key operation via the operation panel 110, for example. For example, a transition is made to the maintenance mode by a service person inputting an ID and password via the operation panel 110, and performing a special operation such as a long press of a specific key or a simultaneous press of a plurality of specific keys that are provided on the operation panel 110. In addition, when leaving the maintenance mode, the normal mode is transitioned to in accordance with a special key operation. It is presumed that such an operation is a special operation that can only be known by a service person, and is not disclosed to a common user.

In an apparatus for performing a facsimile transmission to the image forming apparatus 100 that has transitioned to the maintenance mode, there is no way to know whether or not the image forming apparatus 100 has entered the maintenance mode. Therefore, when a facsimile transmission is performed with respect to the image forming apparatus 100 that is in the maintenance mode, a received image is printed with a specific pattern superimposed thereon, as described above. Meanwhile, in the maintenance mode, to confirm a facsimile reception function of the image forming apparatus 100, for example a service person needs to perform a fax transmission from the service person's place of business, and confirm whether or not the fax transmission can be correctly received and printed.

Therefore, configuration is taken to register a telephone number or terminal identification information of a FAX apparatus of the service person's place of business in the image forming apparatus 100 in advance, and upon a reception of a FAX from the registered number, print by superimposing the specific pattern without updating the charging counter. In addition, configuration is taken so that, for a document received by FAX from a number that is not registered, the charging counter is updated, and printing is performed without the specific pattern being superimposed.

FIG. 8B depicts a view illustrating an example of a screen for registering a telephone number and terminal identification information for which the charging counter is not to be updated, when accepting reception of a FAX after the image forming apparatus 100 has transitioned to the maintenance mode. This screen is transitioned to when a test FAX reception button 801 is pressed in the maintenance mode menu screen of FIG. 8A.

FIG. 8C depicts a view illustrating a screen that is transitioned to when a transmission source number registration button 802 is pressed in the screen of FIG. 8B. A service person inputs a FAX number of the place of business in this screen and presses a confirmation button 803 to thereby register the telephone number. Note that the number registered here is recorded in the RAM 103. Registration of terminal identification information is also possible by a similar procedure. A number registered in the RAM 103 in this way is deleted from the RAM 103 when a transition is made from the maintenance mode to the normal mode.

Figure 9:
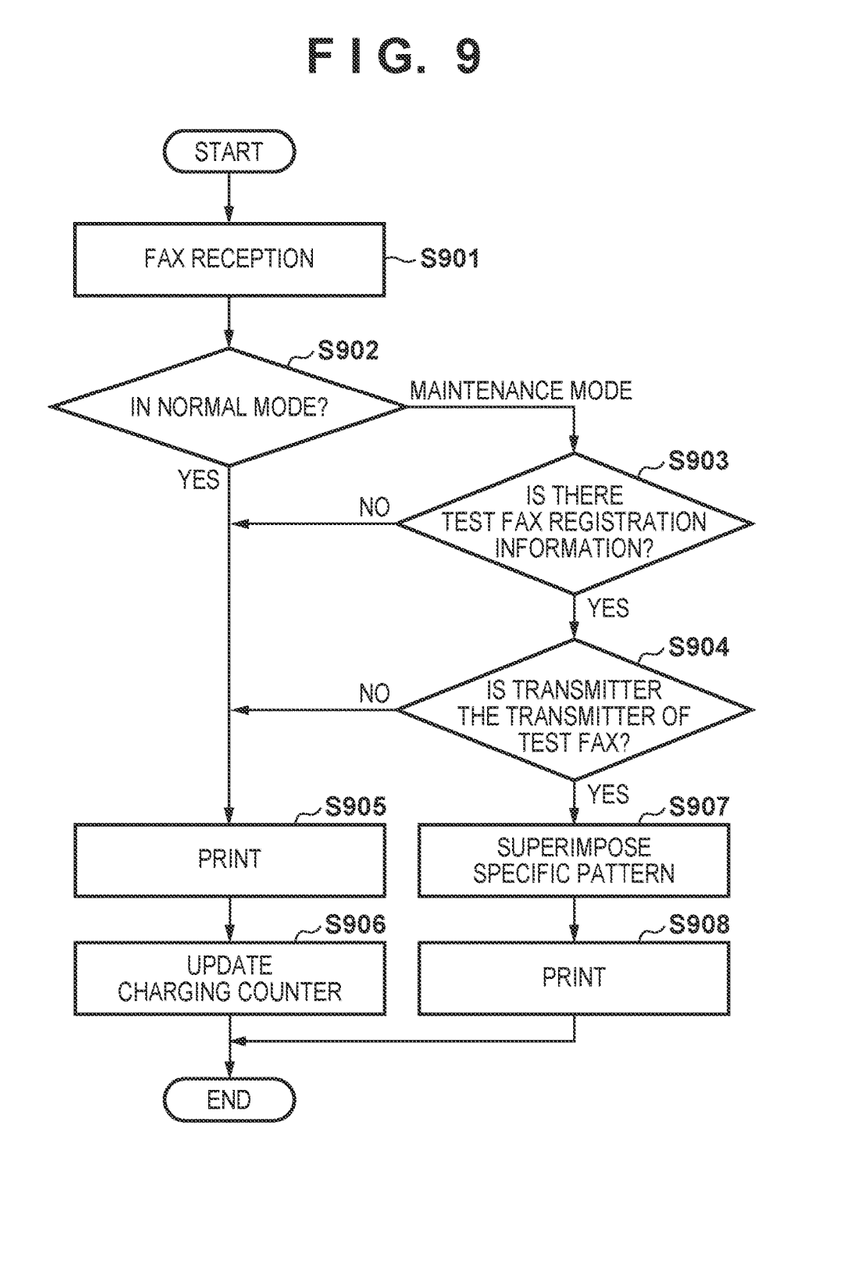
FIG. 9 is a flowchart for describing processing for printing a document, for which a facsimile reception was performed, by the image forming apparatus according to the second embodiment.

FIG. 9 is a flowchart for describing processing for printing a document, for which a facsimile reception was performed, by the image forming apparatus 100 according to the second embodiment. Note that the processing illustrated by the flowchart is achieved by the CPU 102 deploying the control program stored in the ROM 104 into the RAM 103, and executing it.

Firstly, in step S901, upon accepting a FAX reception job, the CPU 102 advances the processing to step S902, and determines whether or not the current operation mode of the image forming apparatus 100 is the normal mode. When the normal mode is determined, the processing proceeds to step S905, but when the current operation mode is determined to not be the normal mode, in other words to be the maintenance mode, the processing proceeds to step S903. In step S903, the CPU 102 determines whether or not a transmission source number or terminal identification information registered by a test FAX reception setting via the screen of FIG. 8B is stored in the RAM 103. When registered, the processing proceeds to step S904, otherwise the processing proceeds to step S905.

In step S904, the CPU 102 determines whether or not the transmission number or terminal identification information of the transmitter of the FAX received in step S901 matches the transmission source number or terminal identification information registered in the RAM 103. When there is a match between the registered transmission source number or terminal identification information and the telephone number or terminal identification information of the transmitter, the processing proceeds to step S907, the specific pattern is superimposed on the print data of the received document, and in step S908, the image data is outputted to the print unit 107 and printed.

Meanwhile, the processing proceeds to step S905 if the operation mode in step S902 is the normal mode, if a test FAX reception setting is not registered in step S903, or when there is no match in step S904 between the registered transmission source number or terminal identification information and transmitter information. In step S905, the CPU 102 prints the received FAX data unchanged, the processing proceeds to step S906, the charging counter is updated in proportion to the number of planes printed in step S905, and this processing terminates.

By the second embodiment, as described above, by registering information of a transmission source from which to receive and print a FAX experimentally in a maintenance mode, it is possible to not charge for the printing when confirming a fax reception function in the maintenance mode.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-139699, filed Jul. 14, 2016, which is hereby incorporated by reference herein in its entirety.

What is claimed is:

1. An image communication apparatus, comprising:
a printer that prints an image based on image data;
a controller that shifts the image communication apparatus to an operation mode, wherein a service person performs printing for a purpose of maintenance in the operation mode, and wherein in a case where the printer prints the image in a state that the image processing apparatus is in the operation mode, a specific pattern is printed on the image by the printer; and
a facsimile interface that receives image data; and
a memory, wherein, in a case where the facsimile interface receives the image data in a state that the image communication apparatus is in the operation mode, the memory stores the image data and the printer does not perform printing based on the image data received by the facsimile interface until the operation mode is released.

2. The image communication apparatus according to claim 1, wherein the operation mode is a mode in which the service person uses a print function, and is a mode for the service person to perform printing and confirm a print result after performing an adjustment of an image to print.

3. The image communication apparatus according to claim 1, wherein the image communication apparatus has a copy function, and
wherein the printer is able to perform printing by the copy function when the image communication apparatus is in the operation mode.

4. The image communication apparatus according to claim 1, wherein, in accordance with releasing of the operation mode, the printer prints the image data stored in the storage.

5. The image communication apparatus according to claim 1, further comprising
a display that displays information indicating that the image communication apparatus is in the operation mode.

6. The image communication apparatus according to claim 1, further comprising an operation panel capable of accepting an instruction from a user,
wherein the controller that shifts the image communication apparatus to the operation mode in accordance with the instruction accepted via the operation panel.

7. The image communication apparatus according to claim 1, wherein charging to a user is not performed when the printer prints an image in a state that the image communication apparatus is in the operation mode.

8. An image communication apparatus, comprising:
a printer that prints an image based on the image data; and
a controller that shifts the image communication apparatus to an operation mode, wherein a service person performs printing for the purpose of maintenance in the operation mode, and wherein in a case where the printer prints the image in a state that the image processing apparatus is in the operation mode, a specific pattern is printed on the image by the printer; and
a network interface that performs POP reception of image data,
wherein the network interface does not perform the POP reception when the image communication apparatus is in the operation mode.

9. A non-transitory computer-readable storage medium storing a program for causing a processor to execute a method of controlling an image communication apparatus having a facsimile interface that receives image data and a printer that prints an image based on image data, the method comprising:
shifting the image communication apparatus to an operation mode, wherein a service person performs printing for a purpose of maintenance in the operation mode, and wherein, in a case where the printer prints the image in a state that the image processing apparatus is in the operation mode, a specific pattern is printed on the image by the printer,
wherein, in case where the facsimile interface receives the image data in a state that the image communication apparatus is in the operation mode, storing the image data and not performing printing based on the image data received by the facsimile interface until the operation mode is released.

10. A non-transitory computer-readable storage medium storing a program for causing a processor to execute a method of controlling an image communication apparatus having a facsimile interface that performs POP reception of image data and a printer that prints an image based on image data, the method comprising:
shifting the image communication apparatus to an operation mode, wherein a service person performs printing for a purpose of maintenance in the operation mode, wherein, in a case where the printer prints the image in a state that the image processing apparatus is in the operation mode, a specific pattern is printed on the image by the printer,
wherein the facsimile interface does not perform the POP reception when the image communication apparatus is in the operation mode.

11. A facsimile apparatus, comprising:
a printer that prints an image based on the image data received by the interface;
a controller that shifts the facsimile apparatus to an operation mode, wherein a service person performs printing for the purpose of maintenance in the operation mode, wherein, in a case where the printer prints the image in a state that the image processing apparatus is in the operation mode, a specific pattern is printed on the image by the printer; and
a facsimile interface that receives image data by a facsimile communication,
wherein, in a case where an incoming call is received by the facsimile apparatus in a state that the facsimile apparatus is in the operation mode, the interface does not receive the image data.

* * * * *